United States Patent
Wade et al.

[11] Patent Number: 6,142,343
[45] Date of Patent: Nov. 7, 2000

[54] CAP AND DUST COVER FOR AN ANTISEPTIC SOAP DISPENSER

[75] Inventors: Allan E. Wade, Manchester, Mo.; Keith D. Alsberg; Jon B. Taylor, both of Chicago, Ill.

[73] Assignee: Steris Inc, Temecula, Calif.

[21] Appl. No.: 09/237,264

[22] Filed: Jan. 25, 1999

Related U.S. Application Data

[60] Provisional application No. 60/114,230, Dec. 30, 1998.

[51] Int. Cl.[7] .................................................. B67D 5/06
[52] U.S. Cl. .................. 222/182; 222/153.1; 222/214; 215/276; 215/352
[58] Field of Search .............................. 222/181.3, 181.2, 222/214, 325, 153.1, 182; 215/250, 251, 256, 276, 352

[56] References Cited

U.S. PATENT DOCUMENTS

| | | | |
|---|---|---|---|
| 3,709,437 | 1/1973 | Wright | 222/190 |
| 3,884,393 | 5/1975 | Wassilieff | 222/153 |
| 3,924,772 | 12/1975 | Magnani | 215/276 |
| 4,331,249 | 5/1982 | Banich, Sr. | 215/352 |
| 4,371,091 | 2/1983 | Gelina . | |
| 4,550,862 | 11/1985 | Barker et al. . | |
| 4,561,570 | 12/1985 | Zulauf et al. . | |
| 4,607,762 | 8/1986 | Zulaf et al. | 222/48 |
| 4,738,375 | 4/1988 | Rosen et al. | 222/185 |
| 4,741,461 | 5/1988 | Williamson et al. | 222/181.2 |
| 4,802,610 | 2/1989 | Cheek et al. | 222/481.5 |
| 4,821,897 | 4/1989 | Weiler . | |
| 4,896,782 | 1/1990 | Hawkins et al. . | |
| 4,942,977 | 7/1990 | Hidding | 222/153.1 |
| 5,004,126 | 4/1991 | Klesius . | |
| 5,007,545 | 4/1991 | Imbery, Jr. . | |
| 5,115,950 | 5/1992 | Rohr . | |
| 5,145,080 | 9/1992 | Imbery, Jr. . | |
| 5,169,003 | 12/1992 | Traupman . | |
| 5,255,805 | 10/1993 | Weiss et al. . | |
| 5,297,599 | 3/1994 | Bucheli | 215/276 |
| 5,390,805 | 2/1995 | Bilani et al. . | |
| 5,445,288 | 8/1995 | Banks | 222/181.2 |
| 5,456,376 | 10/1995 | Luch et al. . | |
| 5,494,174 | 2/1996 | Rohr et al. . | |
| 5,655,687 | 8/1997 | Fitten et al. . | |
| 5,857,580 | 1/1999 | Iidaka | 215/256 |

FOREIGN PATENT DOCUMENTS

| | | |
|---|---|---|
| 0087016A2 | 8/1983 | European Pat. Off. . |
| 0539647A1 | 5/1993 | European Pat. Off. . |
| 0825148A2 | 2/1998 | European Pat. Off. . |
| 3241054A1 | 5/1984 | Germany . |

*Primary Examiner*—Kevin Shaver
*Assistant Examiner*—Keats Quinalty
*Attorney, Agent, or Firm*—Fay, Sharpe, Fagan, Minnich & McKee, LLP

[57] ABSTRACT

A cap (18,120) and a thrust washer (62,128) seal a flexible silicone dispensing tube (10,118) to a neck (20,114) of a container (12,116) which holds a fluid to be dispensed. The thrust washer is shaped to inhibit contact between a lip (50,110) of the dispensing tube and the interior of the cap so that the soft material of the dispensing tube is not damaged when the cap is screwed on to the neck of the container. The thrust washer slides on the cap as the cap is screwed on to limit sliding movement relative to the dispensing tube. A dust cover (24,138) protects the dispensing tube during shipment and storage. The dust cover is attached to the cap by a frangible portion (66) which is broken prior to dispensing the cleaning fluid. A lower projecting ring (86,134) on the thrust washer prevents the dust cover from compressing and damaging the lip of the dispensing tube.

29 Claims, 7 Drawing Sheets

CAP AND DUST COVER FOR AN ANTISEPTIC SOAP DISPENSER

This application claims the priority of U.S. Provisional Application Ser. No. 60/114,230, filed Dec. 30, 1998.

BACKGROUND OF THE INVENTION

The present invention relates to the dispensing arts. It finds particular application in conjunction with connection of a dispensing tube to a neck of a reservoir of fluid for use in dispensers for delivering soap, hand lotions, creams, and the like, into the palm of a user, and will be described with particular reference thereto. It should be appreciated, however, that the invention is also applicable to the dispensing of other fluid, viscous, and pasty materials, such as food products, where a flexible tube is secured to the neck of a container.

Hand-operated dispensers are widely used for delivery of liquid soaps, hand lotions, creams, and the like. These are typically mounted on a wall and consist of a housing and a dispensing mechanism. The fluid is stored in a replaceable reservoir, such as a plastic container, within the housing and delivered, as needed, by actuating the dispensing mechanism.

A wide variety of dispensing mechanisms have been developed for dispensing discrete doses of fluid. One type of dispenser employs a resiliently flexible dispensing tube or pathway which is compressed between two rigid members to deliver the fluid. U.S. Pat. No. 4,667,854 to McDermott, et al., U.S. Pat. No. 4,178,975 to Crespi, and U.S. Pat. No. 5,377,871 to Banks, et al. disclose such dispensers. A cap connects the tube to the neck of a container of fluid.

Because the tube is compressed and released many times during its lifetime, it is desirable for it to be formed from a material without a memory, so that it returns to its original shape after each compression. Such materials tend to be soft and may be damaged during attachment of the cap. This can lead to leakage of the fluid around the area of the cap or premature failure of the tube. Moreover, it desirable to have a cap which is rotatable in one direction only-the capping direction, so that the cap is not accidentally removed during removal of the dust cover. Rohr, et al., U.S. Pat. No. 5,494,174 discloses a removal resistant closure for mounting on the neck of a container. Two helical parallel threads on an interior surface of the cap engage similar threads on an exterior surface of the neck. The threads on the neck converge to form a projection. The arrangement causes the closure threads to jump from their threaded engagement and the cap spins freely on the container. While such a cap would prevent accidental disconnection of a dispensing tube during use, the spinning of the cap could damage the tube. There remains a need for a cap which seals the tube to the container neck without damage to the tube.

Traditionally, fluid containers often include a dust cover, or overcap to protect against accidental spillage or contamination during transit and storage. Weiler, U.S. Pat. No. 4,821,897 discloses an overcap with a frangible web. When the contents are to be dispensed, the web is broken to expose a dispensing nozzle.

If used with dispensing tubes formed from soft materials, however, such an overcap could cause damage to the tube if subjected to pressure during transport and storage. There remains a need for a dust cover which protects a soft dispensing tube during transport and storage.

Caps are often formed with a series of v-shaped serrations on an outer surface of the cap for providing improved gripping equally during capping and uncapping. For dispenser caps, where there is no need for the cap to be later removed, such serrations compromise gripping engagement in the capping direction in exchange for unnecessary and unwanted engagement in the uncapping direction.

The present invention provides a new and improved cap and dust cover which overcomes the above referenced problems and others.

SUMMARY OF THE INVENTION

In accordance with one aspect of the present invention, a closure for sealing an upstream end of a dispensing tube to a neck of a container of fluid to be dispensed is provided. The upstream end of the tube defines a lip. The closure includes a cap having a top and an annular skirt depending from an outer edge of the top. The top defines a central opening. The skirt has an internal thread for engaging an external thread on the container neck. A thrust washer is received within the cap and is rotatable relative to the top of the cap. The thrust washer is configured for maintaining a separation between the cap and the lip of the tube.

In accordance with another aspect of the present invention, a container system for a fluid to be dispensed is provided. The container system includes a container for containing the fluid, with an exterior wall having a neck, and a dispensing tube having an upstream end defining a lip. A closure seals the upstream end of the dispensing tube to the neck of the container. The closure includes a cap having a top and an annular skirt depending from an outer edge of the top. The top defines a central opening and the skirt has an internal thread for engaging an external thread on the container neck. A thrust washer is received within the cap and is rotatable relative to the top of the cap. The thrust washer is configured for maintaining a separation between the pathway and the cap during capping.

In accordance with yet another aspect of the present invention, a method for sealing a dispensing tube to a neck of a container is provided. The dispensing tube includes sides and a lip at an upstream end of the dispensing tube. The method includes positioning a thrust washer between the neck of the container and a cap, an interior of the cap defining a thread. The method further includes positioning the upstream end of the dispensing tube between the thrust washer and the neck of a container, a downstream end of the dispensing tube extending through an opening defined in a top of the cap. Further, the method includes engaging the thread on the interior of the cap with a thread on the exterior of the neck of the container and rotating the cap in a capping direction until the thrust washer compresses the lip of the dispensing tube between the thrust washer and an interior surface of the neck of the container to seal the dispensing tube to the neck of the container.

One advantage of the present invention is that it enables a relatively soft material to be used for the dispensing tube of a soap dispenser.

Another advantage of the present invention is that it prevents the valve from opening in transit.

Yet another advantage of the present invention is that it protects the contents from external contamination during transport and storage.

A further advantage of the present invention is that it provides evidence of tampering.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1:
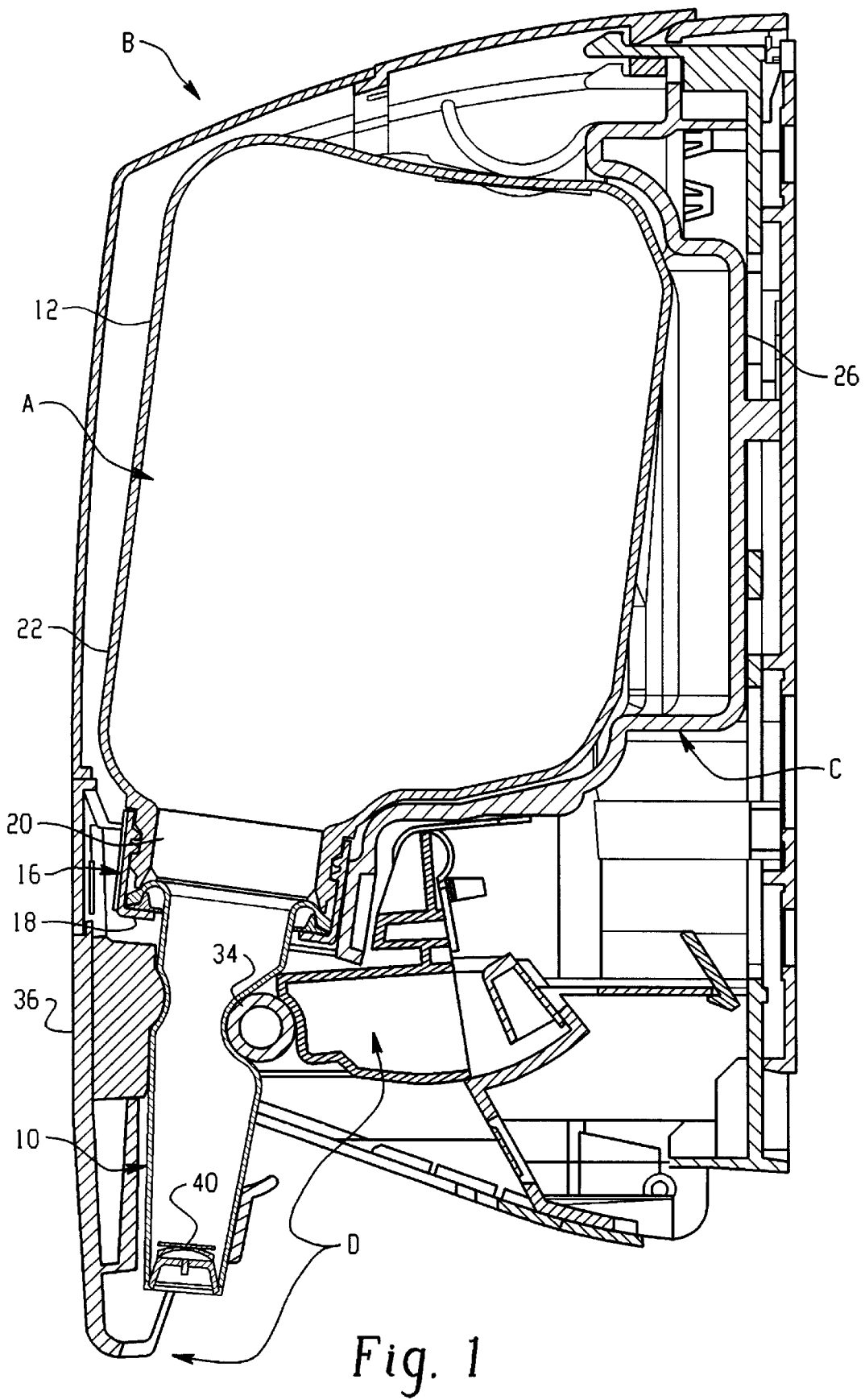
FIG. 1 is a side sectional view of a soap dispenser according to the present invention, shown with a dust cover removed.
Figure 2:
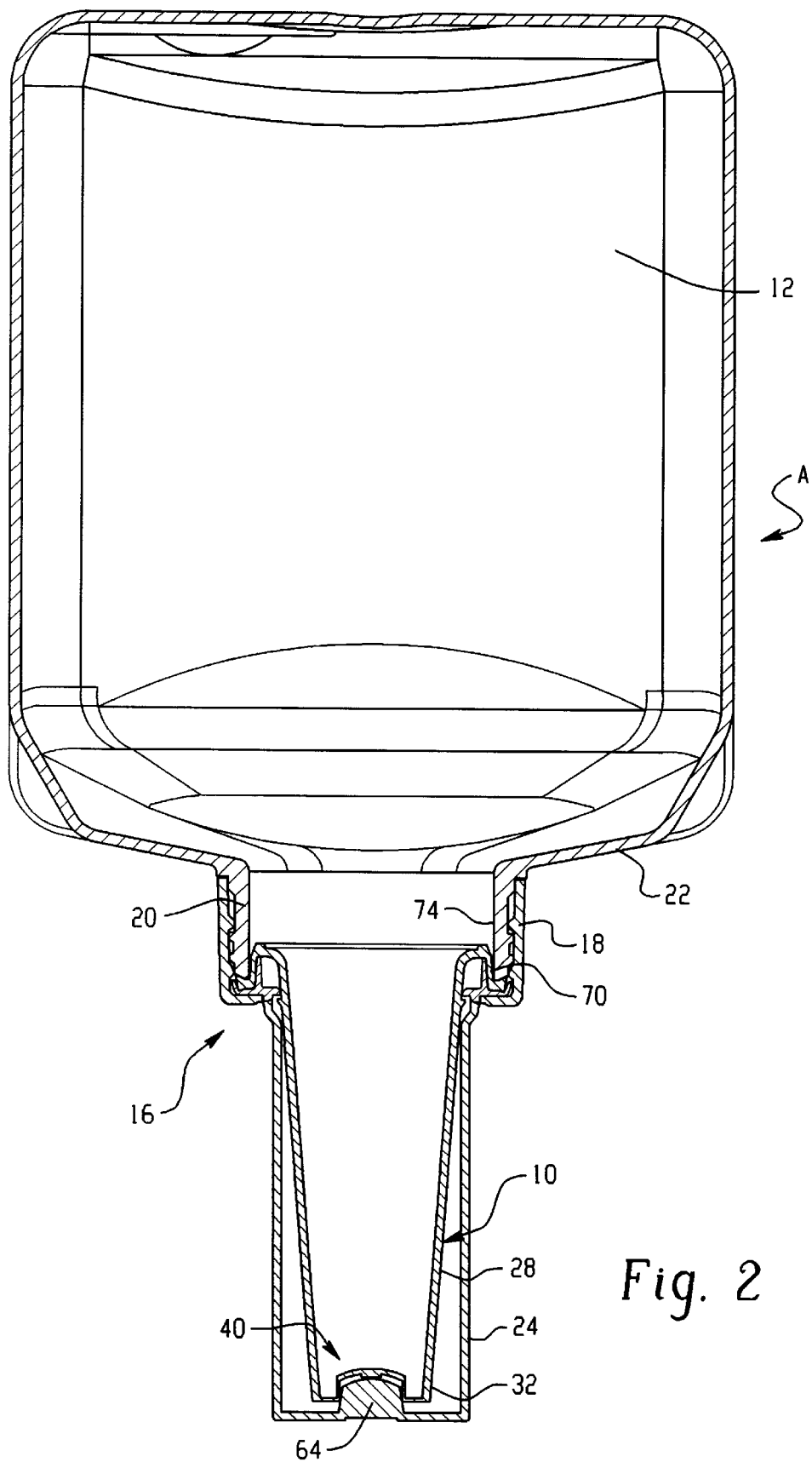
FIG. 2 is a side sectional view of a cap and dust cover assembly joining a pathway to the neck of a container, according to the present invention.

With reference to FIGS. 1 and 2, a replaceable soap reservoir A, for use with an antiseptic soap dispenser B which includes a housing C for supporting the reservoir and a dispensing mechanism D, is shown. The reservoir includes a dispensing tube, or pathway 10, a container 12 which holds an antiseptic soap or other cleaning fluid to be dispensed and a cap and dust cover assembly 16.

Figure 3:
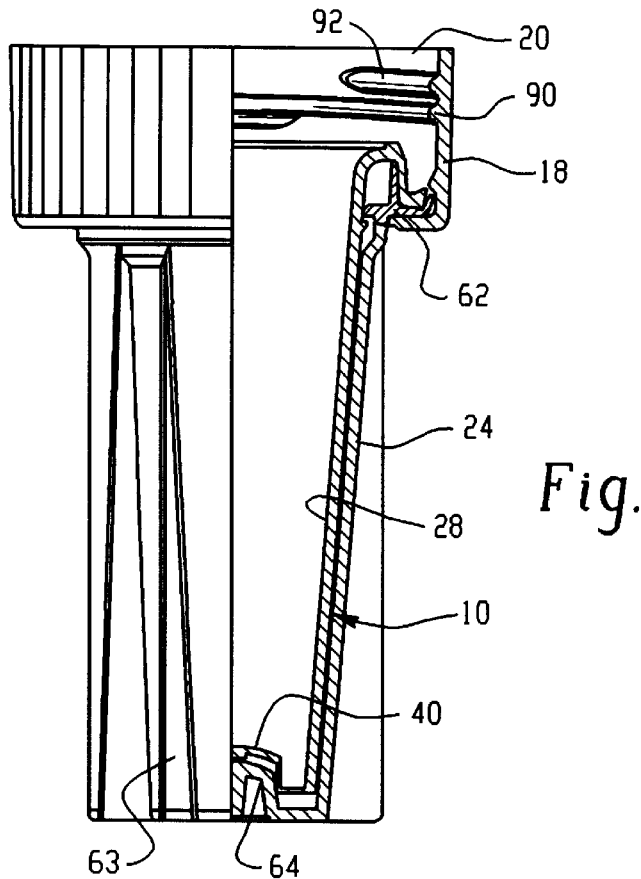
FIG. 3 is a side perspective view of the cap and dust cover of FIG. 2 in partial section.

With reference also to FIG. 3, the cap and dust cover assembly 16 includes a cap 18, which sealingly connects the pathway 10 to a neck 20 defined by an exterior wall 22 of the container 12. The assembly 16 also includes a dust cover 24, which is designed to protect the pathway until use. While the reservoir is described with particular reference to the dispensing of antiseptic soaps, it should be appreciated that it is also suited to dispensing other fluid and pasty materials, including food products, lotions, and hand creams.

The container 12 is preferably formed from a rigid plastic, such as polypropylene. Alternatively, the container is formed from a flexible material, which collapses as the fluid is dispensed. In this case, only the neck 20 is formed from a rigid material and the remainder of the container wall 22 is sealed or otherwise attached to the neck.

Figure 4:
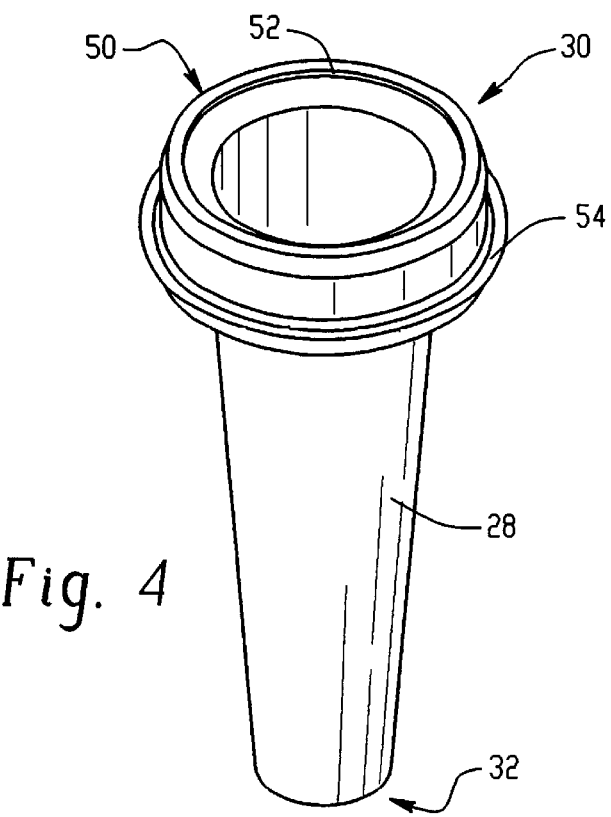
FIG. 4 is a perspective view of the pathway of FIG. 1.
Figure 5:
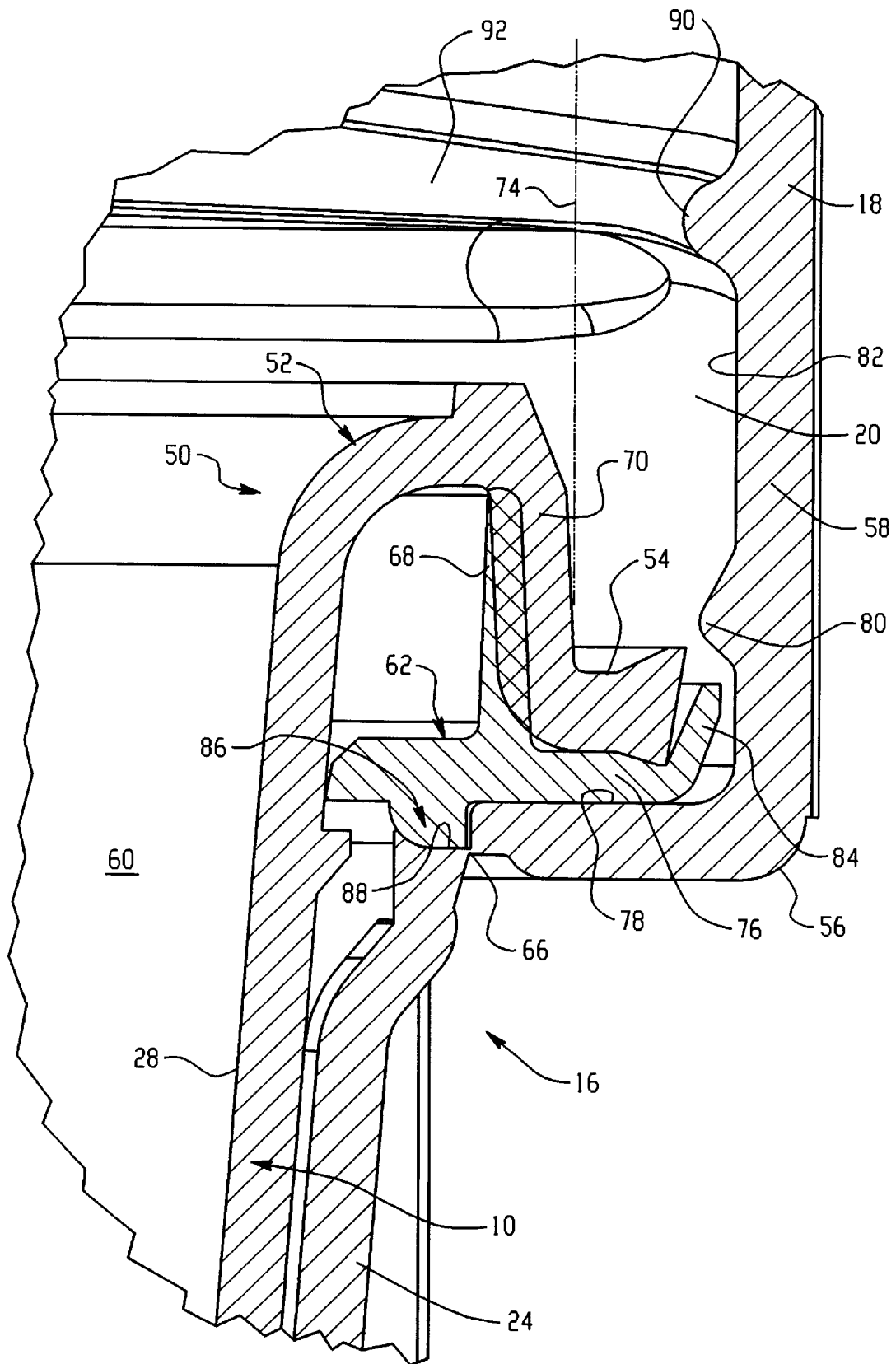
FIG. 5 is an enlarged side sectional view of the top of the pathway and thrust washer of FIG. 2 according to a first embodiment of the invention.

With continued reference to FIG. 3, and reference also to FIGS. 4–5, the pathway, 10 is preferably about 5–8 cm in length and has a side wall 28 which tapers inwardly from a top portion, or upstream end 30, adjacent the container 12, towards a base portion, or downstream end 32 of the pathway. The taper is preferably 0–15° from the vertical, with a particularly preferred taper of 4–6°.

With reference to FIG. 1, the dispensing mechanism D is preferably a pinch-and-roll dispensing mechanism, although other dispensing mechanisms are also contemplated. To dispense fluid from the container, the pathway is squeezed between a roller 34 and a platen 36. The preferred pinch and roll mechanism pinches the pathway 10 closed and then rolls along the pathway pushing the trapped fluid ahead. To accommodate repeated compressions, the pathway material is one which does not have a memory i.e. it can be compressed and then returns to it original shape very quickly, when released. This allows the pathway to refill rapidly with the dispensing fluid. A preferred material for the pathway is silicone rubber, although other resiliently flexible materials are also contemplated.

At the downstream or dispensing end 32 of the pathway is a closure, such as a self sealing slit valve 40, best shown in FIG. 2, although other closure mechanisms are also contemplated. When the pathway is squeezed by the dispensing system, the increased pressure on the fluid adjacent the valve biases the valve to an open position and releases fluid. When the pressure is removed, the valve resiliently returns to its normally closed position.

With particular reference to FIGS. 4 and 5, the top portion 30 of the pathway defines an annular lip 50 which is sealed to the neck 20 of the container 12 by the cap 18. In a first preferred embodiment, the lip and cap are sealed are sealed in a plug seal arrangement. In this embodiment, the lip includes an annular U-shaped portion 52 and a flange 54, which extends circumferentially from the outer edge of the U-shaped portion. In a second preferred embodiment, discussed in greater detail below, the lip and cap are sealed by a land seal.

Figure 7:
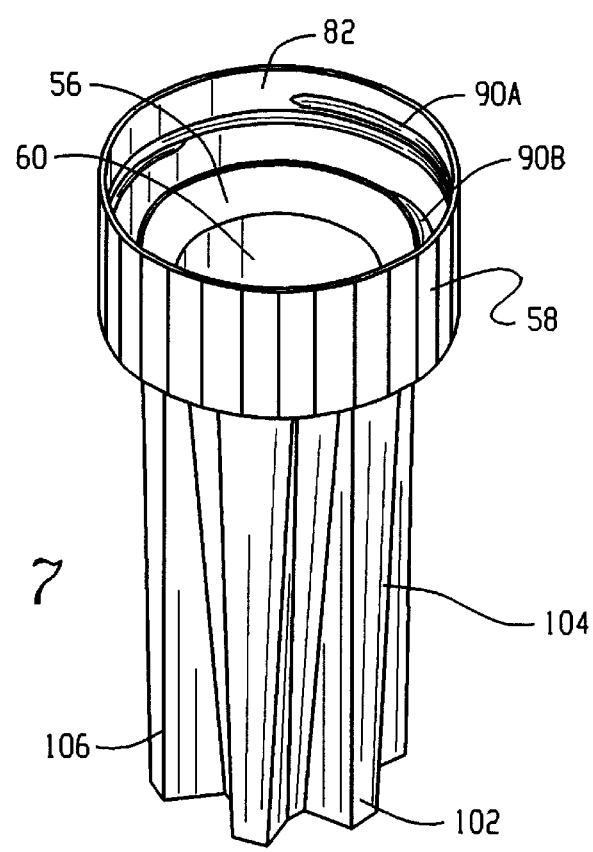
FIG. 7 is a perspective view of the cap and dust cover of FIG. 2.

With reference also to FIG. 7, the cap 18 includes an annular top 56 and an annular skirt 58, which extends circumferentially and perpendicularly from an outer edge of the top. The top 56 of the cap defines a central opening 60, through which the side walls 28 of the pathway extend. The cap is formed of a relatively rigid material.

Figure 6:
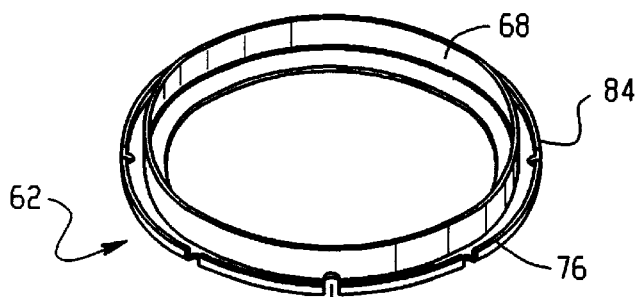
FIG. 6 is a perspective view of the thrust washer of FIG. 2.

With continued reference to FIG. 5, and reference also to FIG. 6, a thrust washer 62 is supported within the cap 18. When the cap is positioned on the pathway during assembly, the thrust washer is interposed between the lip 50 of the silicone pathway 10 and the cap top 56. The thrust washer 62 inhibits the cap from rubbing against the lip 50 of the pathway when the cap and dust cover assembly 16 is screwed on to the neck 20 of the container 12, to seal the pathway to the container. This reduces friction between the cap 18 and the pathway lip 50 which could otherwise result in heating the silicone material of the pathway and causing it to ball or deform. The thrust washer is dimensioned so that it is rotatable relative to the top of the cap. The thrust washer is formed from any suitable material which has a lower coefficient of friction relative to the cap than relative to the pathway.

Figure 8:
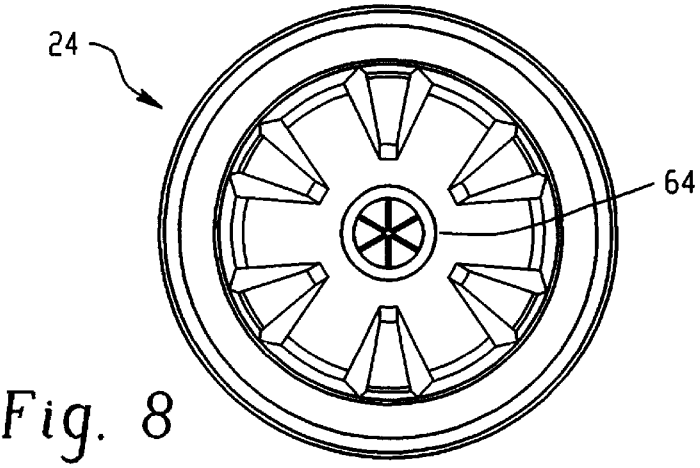
FIG. 8 is a bottom view of the dust cover of FIG. 2.

With reference also to FIGS. 2, 3, and 8 the dust cover 24 preferably has a similar interior shape to the exterior of the pathway 10. This can be achieved by forming the dust cover in the shape of a cone or by providing indented regions 63, as shown in FIG. 3. These regions support the pathway side 28, particularly when the dispenser is subjected to low external pressures during shipment which otherwise could cause the pathway to expand and suffer damage. An inwardly projecting end portion 64 of the dust cover supports the convex self-sealing valve 40 of the pathway during transport and storage and prevents leakage of the soap.

The dust cover is preferably connected to the top 56 of the cap adjacent the opening 60 by a frangible portion, such as a thinned region 66, best shown in FIG. 5. The frangible portion 66 is broken, prior to use, to remove the dust cover. The use of a frangible portion allows the cap and dust cover to be molded as a single piece. Alternatively, the cap and dust cover are formed separately and connected together. Suitable connection means between the cap and the dust cover, such as an internal thread, are also contemplated.

With particular reference to FIGS. 5 and 6, in the first embodiment, the thrust washer 62 includes an annular upper projecting collar or ring 68 which extends vertically into the U-shaped portion 52 of the pathway lip 50. The thrust washer collar supports the U-shaped portion and compresses an outer annular side 70 of the U-shaped portion against an inner surface 74 of the neck of the container as shown more clearly in FIG. 2. An annular rim 76 of the thrust washer extends horizontally circumferentially from the base of the upper projecting collar 68 and is interposed between an interior surface 78 of the top of the cap and the outer flange 54 of the lip, optionally, a surface coating or layer may be interposed between the interior surface 78 and the cap top 56.

A number of laterally spaced projections 80 extend inwardly from an interior surface 82 of the cap skirt 58, towards an outer peripheral slightly upturned edge 84 of the rim 76 of the thrust washer 62. The projections 80 aid in keeping the thrust washer correctly positioned within the cap. The upturned edge of the thrust washer aids in maintaining a space between the interior surface 82 of the cap skirt and the pathway flange 54. Because of the position of the thrust washer, therefore, the pathway 10 has little or no contact with the cap.

The thrust washer 62 has an annular, lower projecting ring or collar 86 which bears the load from the dust cover 24. This prevents the dust cover from pressing on the silicone material of the pathway 10 during transit and storage, and possible resultant damage to the pathway. The lower projecting ring 86 extends from adjacent the base of the upper projecting ring so that it protrudes below a lower surface of the rim 76 of the thrust washer, and is seated adjacent to the frangible region 66. The lower projection ring rests on, or sits adjacent to, an upper surface 88 of the dust cover. When pressure is exerted on the dust cover, the upper surface 88 presses on the lower projecting ring of the thrust washer. The force is distributed evenly over the lip 50 of the pathway, thereby minimizing damage to the pathway.

With reference also to FIG. 7, the interior surface 82 of the cap skirt defines one or more helical threads 90. Preferably two threads 90A and 90B are employed. The two threads run concentrically and substantially parallel to each other towards the top 56 of the cap. As the threads near the top of the cap, the lowermost thread takes on a zero pitch and the two threads converge and meet adjacent the top 56. This particular arrangement of threads protects the pathway by preventing over-tightening of the cap. As the cap is screwed on to the container neck, the parallel threads engage a corresponding thread or threads 92 on an exterior surface of the neck of the container, shown in FIG. 5. When the neck thread 92 reaches the point at which the cap threads meet, the cap jumps from the neck thread 92 and rotates in a free space without further tensioning of the cap. The point at which the cap moves past the container thread is calibrated to provide a sealing engagement between the pathway 10 and the neck 20 of the container without over-compression which could result in tearing or other damage to the pathway. This allows a conventional capping machine to be used for installing the cap without taking special precautions to prevent over-tightening of the cap and possible damage to the pathway. Additionally, once installed, the cap is non-removable, preventing accidental loss of soap.

Obviously, the thread arrangement could be reversed, with a single thread 90 on the cap skirt and a pair of threads 92A and 92B on the container, or a pair of threads on both the skirt and the neck could be used. Alternatively, other methods of connecting the cap to the neck are also contemplated, including a conventionally threaded cap and neck, or a child-proof cap.

To connect the pathway 10 to the container 12, the thrust washer 62 is inserted into the cap 18 so that the rim 76 rests on the inner surface 78 of the cap top. Preferably, the upturned edge 84 of the thrust washer rim includes a number of spaced, cut-out portions 93 which assist in moving the thrust washer past the projections 80 in the interior of the cap. The cut-out portions 93 allow the upturned edge 84 to flex inward as the thrust washer passes the projections and then flex outward again so that the thrust washer is retained in position in the cap by the projections. Preferably, the pathway is then inserted into the cap and dust cover assembly 16, with the lip 50 of the pathway on top of the thrust washer and the side wall 28 of the pathway extending through the opening 60 in the cap skirt 58 and into the dust cover 24. Alternatively, the pathway is placed on to the neck of the container, which is already filled with cleaning fluid. In either case, the cap 18 is screwed onto the neck 20 of the container in the capping direction. Over-tightening and removal of the cap is inhibited by the arrangement of parallel threads.

When the cap has been rotated sufficiently for the threads on the container neck 92 to pass beyond the threads of the cap skirt 90, the thrust washer is positioned to compress the lip of the pathway against the interior surface 74 of the container neck, forming a seal. The lower surface of the thrust washer rim 76 is preferably relatively smooth and thus the interior surface 78 of the top of the cap slides over the thrust washer if the cap is rotated further. The thrust washer maintains a relatively fixed position, however, with respect to the lip of the pathway, thereby avoiding rubbing and potential damage to the pathway.

Once the cap 18 has been tightened to the point at which the threads 90, 92 are no longer in engagement, the cap is non-removable. Rotation of the cap in a reverse direction to the capping direction does not release the lip 50 of the pathway from engagement with the container neck 20. This prevents accidental spillage of the cleaning fluid during removal of the dust cover 24. Of course, if it desirable to reuse the container 12, the cap may be configured for re-engagement of the threads so that the cap may be removed once the contents of the container are depleted.

Figure 9:
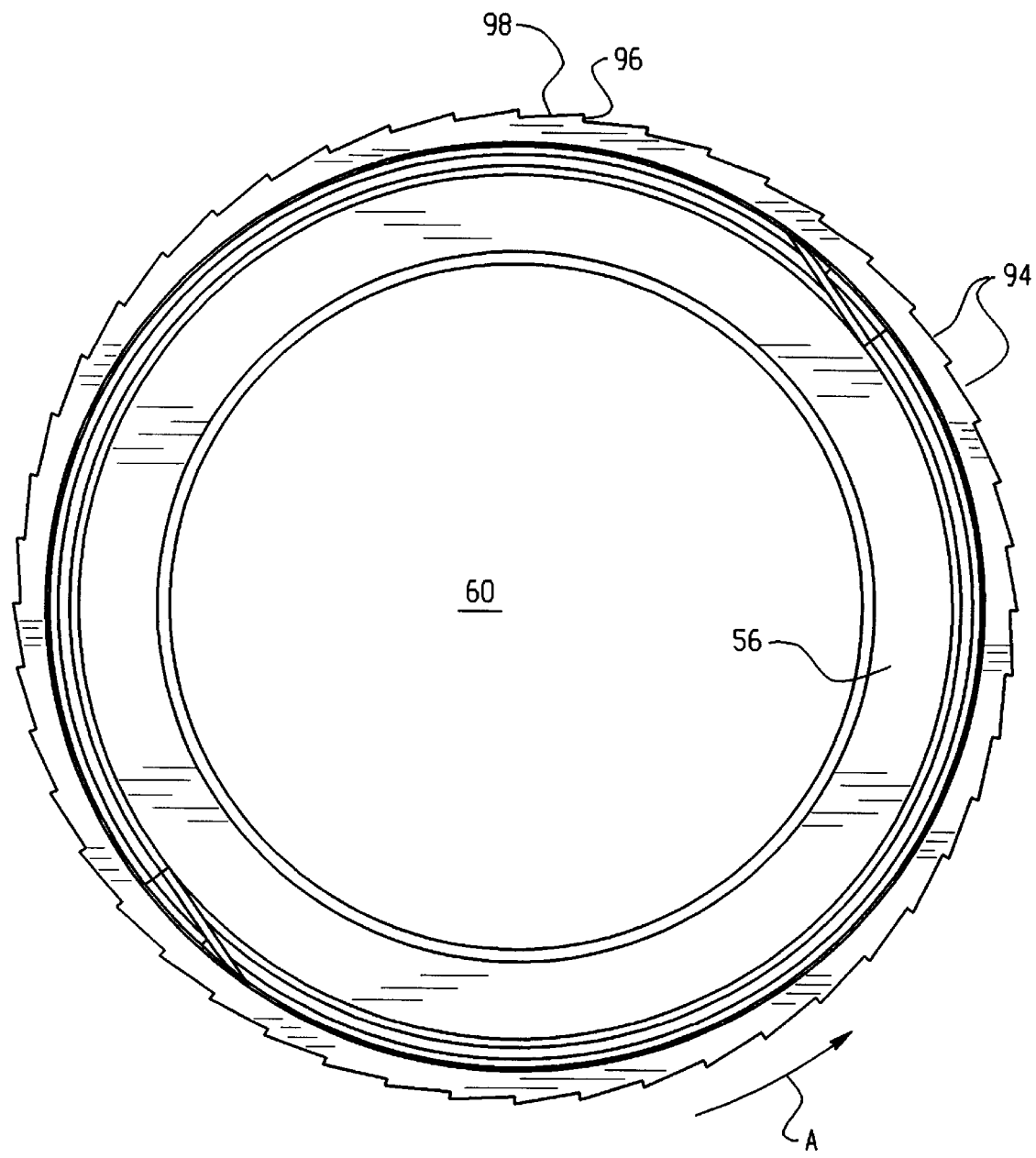
FIG. 9 is an enlarged top view of the cap of FIG. 2 with the dust cover removed, showing external serrations; and, FIG. 10 is a is an enlarged side sectional view of the top of the pathway and thrust washer of FIG. 2 according to a second embodiment of the invention.

With reference to FIG. 9, the cap has exterior serrations 94 which maximize capping torque and grasping engagement in the capping direction. The serrations have an asymmetric ratchet-like profile. Since the cap is designed to be non-removable, the profile is such that the transmission of torque is greatest in the capping direction, indicated by arrow A. Each of the serrations includes a capping face 96, which extends substantially perpendicularly from the cap skirt, and an adjacent sloping face 98, the angle of which is determined by the spacing between the serrations. The capping faces 96 face corresponding faces on a capping machine (not shown) during capping. Thus maximum rotational force can be transferred to the cap through the perpendicular capping faces 96.

The reservoir is transported and stored with the cap and dust cover assembly in position until it is to be inserted into a soap dispenser. Preferably, the dust cover is removed by applying a force to a base 102 of the dust cover, perpendicular to the axis of the pathway 10, which breaks the frangible portion 66. Alternatively, the dust cover may be removed by rotating the dust cover in either the capping or an opposite direction. As shown in FIG. 6, an exterior surface 104 of the dust cover 24 is shaped for convenient grasping of the dust cover by a user during removal. Preferably, the exterior surface defines a series of vertically extending projections 106 which are readily grasped by the user's hand. Alternative surface configurations for aiding removal are also contemplated.

Figure 10:
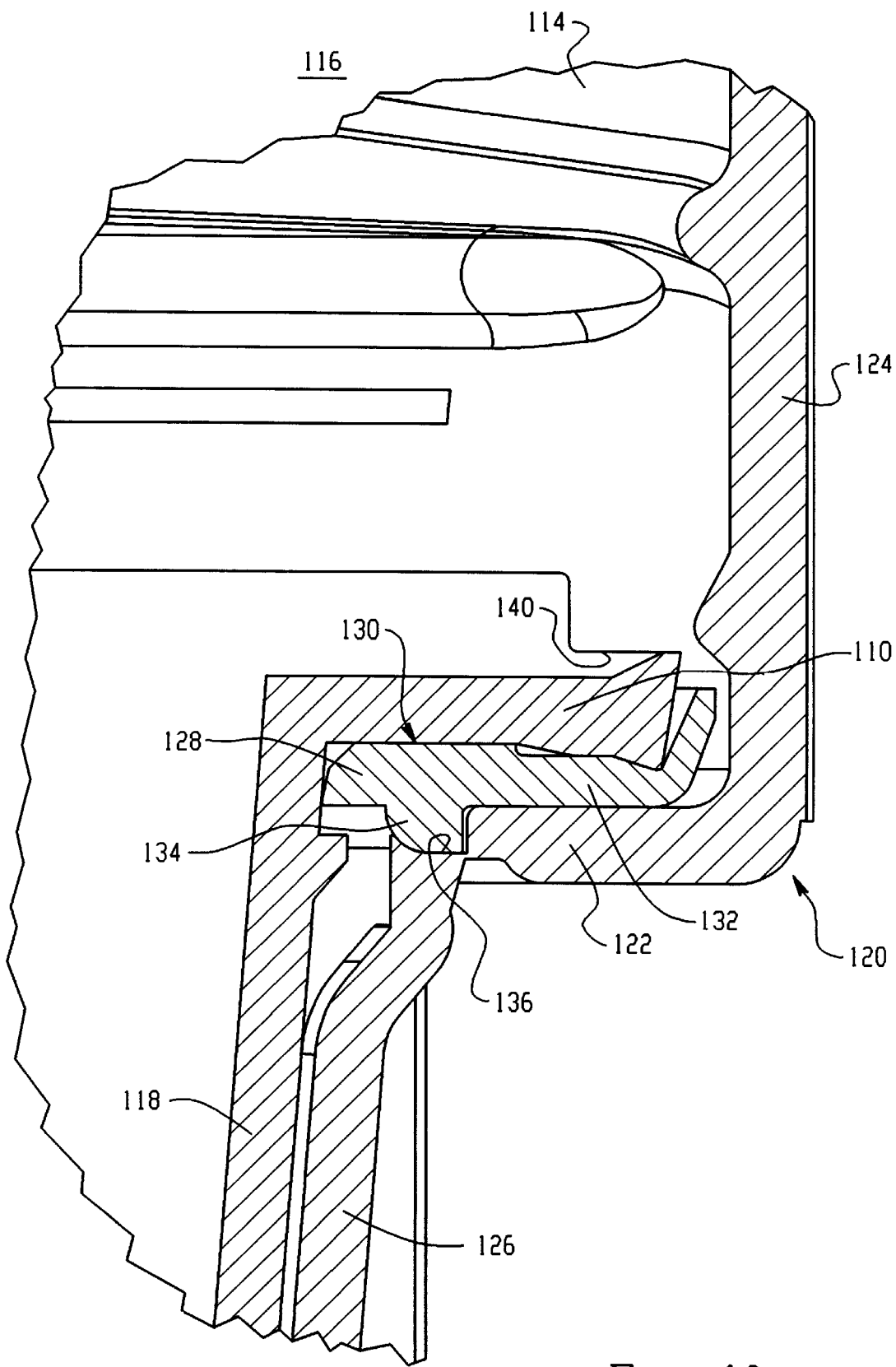

With reference to FIG. 10, in the second preferred embodiment, a land seal is formed between a lip 110 of a pathway 112 and a neck 114 of a container 116. In this embodiment, the lip of the pathway extends generally perpendicularly in the shape of an annulus from a cone-shaped side 118 of the pathway. A cap 120, similar to that of the first embodiment, includes a top 122 and a skirt 124. A dust cover 126 is connected to the cap, as before. A thrust washer 128 is positioned between the cap top and a lower surface 130 of the pathway lip. The thrust washer includes an annular rim 132 and a lower projecting ring 134 for engaging an upper surface 136 of the dust cover 126. The thrust washer 128 is thus similar to the thrust washer 62 of the first embodiment, except in that it lacks an upper projecting ring.

When the cap 120 is screwed on to the neck 114 of the container, the lip 110 of the pathway is compressed between the thrust washer and a lower surface 140 of the neck of the container. As for the first embodiment, the thrust washer ensures that there is little or no contact between the cap and the pathway during capping, thus preventing damage to the pathway.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A dispensing tube and a closure for sealing an upstream end of the dispensing tube to a neck of a container of fluid to be dispensed, the upstream end of the tube defining a lip including an annular flange, the closure comprising:
   a cap, the cap including a top and an annular skirt depending from an outer edge of the top, the top defining a central opening, the skirt having an internal thread for engaging an external thread on the container neck;
   a thrust washer received within the cap, the thrust washer disposed between the lip flange and the top of the cap and being configured to engage and remain stationary with the lip flange as the cap rotates such that the thrust washer provides a bearing surface on which the top of the cap slides.

2. The dispensing tube and closure of claim 1, wherein the thrust washer includes:
   an annular rim; and
   an upper projecting ring extending from the annular rim, the upper projecting ring dimensions for compressing the lip of the dispensing tube between the upper projecting ring and an interior surface of the neck of the container.

3. A dispensing tube and a closure for sealing an upstream end of the dispensing tube to a neck of a container of fluid to be dispensed;
   the upstream end of the tube defining a lip, the lip including a U-shaped portion;
   the closure comprising:
   a cap, the cap including a top and an annular skirt depending from an outer edge of the top, the top defining a central opening, the skirt having an internal thread for engaging an external thread on the container neck;
   a washer received within the cap and rotatable relative to the top of the cap, the washer configured for maintaining a separation between the cap and the lip of the tube, the washer including:
      an annular rim; and
      a projecting ring extending from the annular rim, the projecting ring being dimensioned for compressing an outer annular side of the U-shaped portion between the projecting ring and an interior surface of the neck of the container.

4. The dispensing tube and closure of claim 1, wherein the cap further includes:
   a thrust washing guiding projection which extends inwardly from an interior surface of the skirt, the thrust washing guiding projection situated for positioning the thrust washer in the cap.

5. The dispensing tube and closure of claim 3, wherein the lip of the dispensing tube includes a flange which extends circumferentially from the outer annular side of the U-shaped portion and wherein the rim of the thrust washer is shaped for compressing the flange between the rim and the neck of the container.

6. A dispensing tube and a closure for sealing an upstream end of the dispensing tube to a neck of a container of fluid to be dispensed, the neck of the container defining an external thread, the upstream end of the tube defining a lip, the closure comprising:
   a cap, the cap including a top and an annular skirt depending from an outer edge of the top, the top defining a central opening, the skirt having an internal thread for engaging the external thread on the container neck;
   an additional thread segment, the additional thread segment defined adjacent one of the external thread and the internal thread, the additional thread segment converging with the one of the external thread and the internal thread to define a region which is narrower than a width of the other of the external thread and the internal thread, whereby the external and internal threads disengage from threaded engagement when the cap is rotated in a capping direction until the other of the external thread and the internal thread reaches the region, preventing further tightening of the cap; and
   a thrust washer rotatably received within the cap.

7. The dispensing tube and closure of claim 1, wherein the thrust washer has a smooth lower surface which slides over the interior surface of the top of the cap when the cap is rotated in the capping direction.

8. The dispensing tube and closure of claim 1, further including a dust cover which is releasably connected to the cap.

9. The dispensing tube and closure of claim 8, wherein the dust cover is connected to the cap by a frangible portion.

10. A dispensing tube and closure for sealing an upstream end of the dispensing tube to a neck of a container of fluid to be dispensed, the upstream end of the tube defining a lip, the closure comprising:
    a cap, the cap including a top and an annular skirt depending from an outer edge of the top, the top defining a central opening;
    a dust cover which is integrally connected with the cap by a frangible portion, the dust cover and the cap being molded as a single piece, a thinned region between the cap and the dust cover defining the frangible portion; and a washer rotatably received within the cap, such that the washer, the neck of the container, and the lip of the tube remain stationary relative to each other and rotate together relative to the cap.

11. The dispensing tube and closure of claim 8, wherein the thrust washer includes a lower annular projecting ring which is positioned between an upper surface of the dust cover and the lip of the dispensing tube.

12. The dispensing tube and closure of claim 8, wherein the dust cover includes an inwardly projecting end portion for supporting a self sealing valve on the dispensing tube.

13. A dispensing tube and closure for sealing an upstream end of the dispensing tube to a neck of a container of fluid to be dispensed, the upstream end of the tube defining a lip, the closure comprising:

a cap, the cap including a top and an annular skirt depending from an outer edge of the top, the top defining a central opening, the skirt engaging the container neck;

a thrust washer received within the cap and rotatable relative to the top of the cap;

asymmetrical serrations extending from an exterior surface of the skirt of the cap, each of the serrations including a capping edge which is substantially perpendicular to the exterior surface and a sloping edge, the capping edge being positioned for engaging a corresponding surface on a capping machine; and a dust cover frangibly connected to the cap and covering the tube, the dust cover including projections for a user to grip during removal of the dust cover.

14. The dispensing tube and closure of claim 8, wherein the dust cover includes vertically extending projections for gripping by a user during removal of the dust cover.

15. A container system for a fluid to be dispensed, the container system comprising:

a container for containing the fluid, the container including an exterior wall which defines a neck;

a dispensing tube, an upstream end of the tube defining a resilient lip; and a closure which seals the upstream end of the dispensing tube to the neck of the container, the closure including:

a cap, the cap including a top and an annular skirt depending from an outer edge of the top, the top defining a central opening, the skirt having an internal thread for engaging an external thread on the container neck; and a thrust washer received within the cap and rotatable relative to the top of the cap, the thrust washer being positioned to prevent the top of the cap from engaging the lip of the dispensing tube as the cap rotates during capping.

16. The container system of claim 15, wherein the thrust washer includes:

an annular rim; and, an upper projection ring extending from the annular rim, the upper projecting dimensioned for compressing the lip of the dispensing tube between the upper projecting ring and an interior surface of the neck of the container.

17. A container system for a fluid to be dispensed, the container system comprising:

a container for containing the fluid, the container including an exterior wall which defines a neck;

a dispensing tube, an upstream end of the tube defining a lip, the lip of the dispensing tube including a U-shaped portion, with an outer annular sides; and a closure for sealing the upstream end of the dispensing tube to the neck of the container, the closure including:

a cap, the cap including a top and an annular skirt depending from an outer edge of the top, the top defining a central opening, the skirt having an internal thread for engaging an external thread on the container neck; and a thrust washer received within the cap, the thrust washer including:

an annular rim which is disposed between the dispensing tube lip and the cap top, and an upper projection ring extending from the annular rim, the outer annular side of the U-shaped portion of the lip of the dispensing tube being positioned between the upper projecting ring and an interior surface of the neck of the container.

18. The container system of claim 15, wherein the cap further includes:

a thrust washer guiding projection which extends inwardly from an interior surface of the skirt, the projection assisting in positioning the thrust washer in the cap.

19. The container system of claim 17, wherein the lip of the dispensing tube includes a flange which extends circumferentially from the outer annular side of the U-shaped portion and wherein the flange is positioned between the rim of the thrust washer and the neck of the container.

20. A container system for a fluid to be dispensed, the container system comprising:

a container for containing the fluid, the container including an exterior wall which defines a neck with an external thread;

a dispensing tube, an upstream end of the tube defining a lip;

a closure for sealing the upstream end of the dispensing tube to the neck of the container, the closure including:

a cap, the cap including a top and an annular skirt depending from an outer edge of the top, the top defining a central opening, the skirt having an internal thread for engaging an external thread on the container neck; and a thrust washer rotatable received within the cap between the dispensing tube lip and the cap top; and an additional thread, the additional thread defined adjacent one of the external thread and the internal thread, the additional thread converging with the one of the external thread and the internal thread to define a region which is narrower than a width of the other of the external thread and the internal thread, whereby the external and internal threads disengage from threaded engagement when the cap is rotated in a capping direction until the other of the external thread and the internal thread reaches the region, preventing further tightening of the cap.

21. The container system of claim 15, wherein the thrust washer has a smooth lower surface which slides over the interior surface of the top of the cap when the cap is rotated in the capping direction.

22. The container system of claim 15, further including a dust cover which is releasably connected with the cap by a frangible portion.

23. The container system of claim 22, wherein the thrust washer includes a lower projecting ring which is positioned between an upper surface of the dust cover and the lip of the dispensing tube.

24. The container system of claim 22, wherein the dust cover includes an inwardly projecting end portion for supporting a self sealing valve on the dispensing tube.

25. The container system of claim 15, wherein the cap includes:

asymmetrical serrations extending from an exterior surface of the skirt of the cap, each of the serrations including a capping edge which is substantially perpendicular to the exterior surface and a sloping edge, the capping edge being positioned for engaging a corresponding surface on a capping machine.

26. The container system of claim 22, wherein the dust cover includes vertically extending projections for gripping by a user during removal of the dust cover.

27. A method for sealing a dispensing tube to a neck of a container, the dispensing tube including sides and a lip at an upstream end of the dispensing tube, the method comprising:

positioning a thrust washer between the neck of the container and a cap, such that the thrust washer slidably contacts an interior surface of a top of the cap, a skirt of the cap defining an interior thread;

positioning the upstream end of the dispensing tube between the thrust washer and the neck of a container, a downstream end of the dispensing tube extending through an opening defined in a top of the cap;

engaging the thread on the interior of the cap with a thread on the exterior of the neck of the container; and rotating the cap in a capping direction such that the top of the slides on the thrust washer as the thrust washer remains stationary relative to and compresses the lip of the dispensing tube between the thrust washer and an interior surface of the neck of the container to seal the dispensing tube to the neck of the container.

28. A method for sealing a dispensing tube to a neck of a container, the dispensing tube including sides and a lip at an upstream end of the dispensing tube, the method comprising:

positioning a thrust washer between the neck of the container and a cap, an interior of the cap defining a thread;

positioning the upstream end of the dispensing tube between the thrust washer and the neck of a container, a downstream end of the dispensing tube extending through an opening defined in a top of the cap;

engaging the thread on the interior of the cap with a thread on the exterior of the neck of the container;

rotating the cap in a capping direction as the thrust washer compresses the lip of the dispensing tube between the thrust washer and a surface of the neck of the container to seal the dispensing tube to the neck of the container; and continuing to rotate the cap until a projection adjacent one of the cap thread and the container neck thread causes the threads to disengage and the cap to rotate without further compression of the dispensing tube lip.

29. The method of claim 28, further including, pivoting a dust cover which is connected to the top of the cap until a frangible connection between the cap and the dust cover is broken.

* * * * *